(No Model.)

A. J. BYRNE.
FLOWER POT.

No. 437,565. Patented Sept. 30, 1890.

Witnesses,
Geo. H. Strong
J. H. Kruse

Inventor,
Amanda J. Byrne
By Dewey & Co.
Attys

UNITED STATES PATENT OFFICE

AMANDA J. BYRNE, OF TUSCARORA, NEVADA.

FLOWER-POT.

SPECIFICATION forming part of Letters Patent No. 437,565, dated September 30, 1890.

Application filed April 9, 1890. Serial No. 347,255. (No model.)

*To all whom it may concern:*

Be it known that I, AMANDA J. BYRNE, a citizen of the United States, residing at Tuscarora, Elko county, State of Nevada, have invented an Improvement in Flower-Pots; and I hereby declare the following to be a full, clear, and exact description of the same.

My invention relates to a certain improvement in flower-pots.

The object is to construct a pot which shall be light, durable, tight, and capable of being opened, so as to remove the contents at will.

It consists of two metallic sections, each forming one half of the pot, hinged together on a vertical line at one side and having means for securing the meeting edges upon the opposite side, a circular bottom one edge of which is fixed to one of the halves and the other adapted to fit in a groove or channel in the opposite half, so as to make a tight joint when the parts are closed together.

Figure 1:
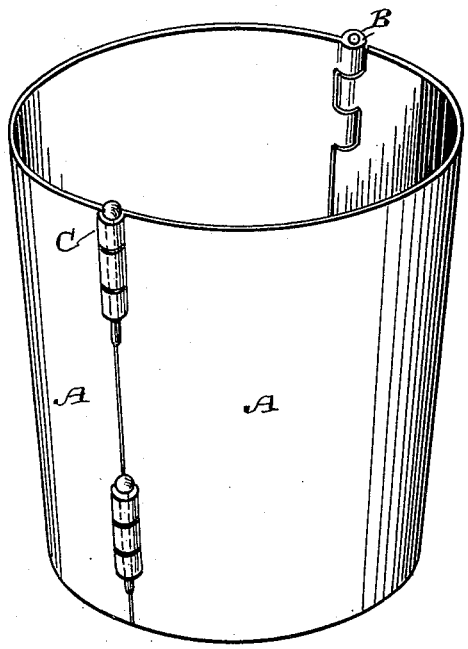
Figure 2:
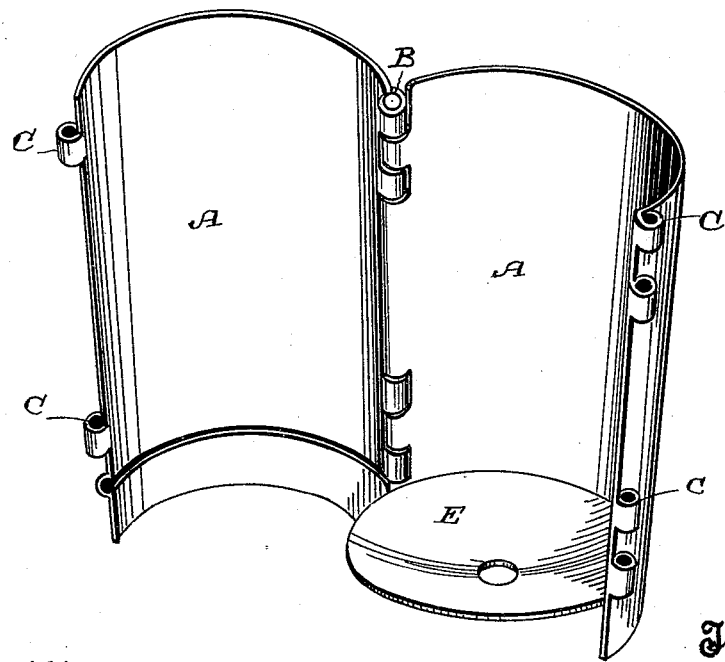

Referring to the accompanying drawings for a more complete explanation of my invention, Figure 1 is a view of my flower-pot in form for use. Fig. 2 shows the parts open about the hinges.

In making my flower-pot I prefer to use tin or other suitable sheet metal, which is shaped in two halves A A, these halves having hinges B B upon one side, so that they may easily open and close about this axis. Upon the opposite side and meeting edges of the two parts A A, when closed together, are formed the locking-lugs C, through which rods or pins may be passed to hold these parts together, the edges meeting so as to form a dirt-tight joint.

The bottom E is made circular, and one edge is permanently fastened into one of the halves A, either close to the bottom or at a short distance above, so as to leave a projecting flange below the bottom upon which the pot stands. The other half A has a horizontal groove or channel made around its inner periphery corresponding with the position of the bottom, so that when the two parts of the pot are closed together the free edge of the bottom will fit into this channel and make a close joint. By this construction I am enabled to open the sides of the pot when it is desired to remove or transplant the flowers without disturbing or injuring the roots.

The interior and exterior of the pot may be painted with any suitable material and color to preserve the metal, and by reason of the use of metal the pots are made much lighter than those of earthenware, practically indestructible, and will retain moisture in the earth within the pot much longer.

Having thus described my invention, what I claim as new, and desire to secure by Letters Patent, is—

1. A flower-pot composed of two semi-cylindrical or conical sections hinged together at one side and having the meeting edges at the opposite side provided with uniting and locking devices, a circular bottom having one-half of its periphery permanently fixed in one of the sides of the pot, and a groove or channel formed in the opposite side, into which the corresponding edge or periphery of the bottom fits when the pot is closed together, substantially as herein described.

2. A flower-pot consisting of the two halves formed of sheet metal hinged together upon a vertical meeting line upon one side, having uniting and locking devices upon the opposite meeting edges thereof, a circular bottom having half of its periphery fixed to one of the sides at a point above the bottom edge, and a horizontal groove or channel formed in the other side, into which the free edge of the bottom fits when the sides are closed together, substantially as herein described.

In witness whereof I have hereunto set my hand.

AMANDA J. BYRNE.

Witnesses:
BERTHA BELLE BYRNE,
JAS. P. BYRNE.